United States Patent [19]
Mumford

[11] Patent Number: 5,870,457
[45] Date of Patent: Feb. 9, 1999

[54] METHOD AND SYSTEM FOR TRANSFERRING A DATA MODEM CALL

[75] Inventor: Gregory L. Mumford, Marion, Iowa

[73] Assignee: MCI Worldcom, Inc., Ga.

[21] Appl. No.: 884,736

[22] Filed: Jun. 30, 1997

[51] Int. Cl.⁶ .................................................. H04M 11/00
[52] U.S. Cl. ...................... 379/93.09; 379/52; 379/93.28
[58] Field of Search .................... 379/52, 90.01, 379/93.01, 93.05, 93.06, 93.07, 93.09, 93.17, 93.23, 93.26, 93.28, 265, 266, 309, 27

[56] References Cited

U.S. PATENT DOCUMENTS

| | | | |
|---|---|---|---|
| 3,624,307 | 11/1971 | Sikorsky | 379/265 |
| 4,805,209 | 2/1989 | Baker, Jr. et al. | 379/93.23 |
| 5,008,930 | 4/1991 | Gawrys et al. | 379/96 |
| 5,353,338 | 10/1994 | Nakano | 379/93.28 |
| 5,396,536 | 3/1995 | Yudkowsky | 379/52 |
| 5,475,733 | 12/1995 | Elsdorfer et al. | 379/52 |
| 5,559,857 | 9/1996 | Dowens | 379/52 |
| 5,621,789 | 4/1997 | McCalmount | 379/93.17 |
| 5,684,870 | 11/1997 | Maloney et al. | 379/212 |
| 5,703,943 | 12/1997 | Otto | 379/309 |

*Primary Examiner*—Curtis A. Kuntz
*Assistant Examiner*—Melur Ramakrishnaiah

[57] ABSTRACT

Phone calls between data modems may be transferred without dropping the phone calls. An intermediate modem phone call is established between modems that are not currently involved in a modem call to activate a modem that is to receive a modem call transfer. After the modem that is to receive the transfer is activated, the modem call transfer occurs with the assistance of a switching mechanism, such as an automatic call distributor (ACD). The interruption to the modem caused by the transfer is negligible enough so as to not cause the modem call to be dropped. For some types of modems, a three-way conference call may be established between modems and one of the modems may be dropped to realize the modem call transfer.

23 Claims, 7 Drawing Sheets

METHOD AND SYSTEM FOR TRANSFERRING A DATA MODEM CALL

TECHNICAL FIELD

The present invention relates generally to telecommunications systems, and more particularly, to a method and system for transferring a data modem call.

BACKGROUND OF THE INVENTION

The use of modems has increased dramatically in the past few years. A typical modem acts as a modulator/demodulator that modulates/demodulates at least one carrier signal to enable digital data to be carried over the analog telephone network. In a standard data telephony application, an analog carrier signal is modulated at a source modem to code digital information, and the modulated carrier signal is then sent over the analog telephone network to a destination modem that demodulates the analog carrier signal to extract the digital data. The connection between the modems is created by placing a telephone call from the source modem to the destination modem. One of the limitations of such data modem calls is that they cannot be readily transferred without the calls being dropped. With conventional voice telephone calls, the call may readily be transferred from one phone to another. However, attempting to transfer a data modem call from one data modem to another results in the call being dropped due to the interruption of the carrier signal. Data modems include built-in features for dropping a call if the carrier signal is interrupted for more than a negligible amount of time.

One environment in which this inability to transfer data modem calls has proven problematic is in Telecommunications Relay Service (TRS) centers. TRS centers are call centers that allow a hearing-impaired person to communicate over telephone lines using a workstation (such as a personal computer) and a modem to communicate with an operator at the TRS center. The operator at the TRS center communicates to the hearing-impaired person via a separate workstation and modem. In addition, the operator at the TRS center communicates with a person who is not earing-impaired via a conventional telephone set. The role of the TRS operator is to translate messages between the modem call with the hearing-impaired person and the voice call with the person who is not hearing impaired.

FIG. 1 shows an example of a typical configuration for a TRS center. The hearing-impaired party 10 communicates with the TRS center 12 in order to communicate with a nonhearing-impaired party 14. The hearing-impaired party has a workstation 22 that is interfaced with a data modem 20. A modem call is established between the modem 20 of the hearing-impaired party 10 and a data modem 30 at an operator station 24 within the TRS center 12. Data 16 is passed between the respective modems 20 and 30 as the modem call progresses. Messages from the hearing-impaired party 10 appear at a display device that is part of the workstation 32 of an operator at the operator station 24. The operator at operator station 24 also has a phone set 34 that is used to place a voice call with the nonhearing-impaired party 14. The nonhearing-impaired party 14 has a conventional telephone 28, and voice signals are transmitted between the nonhearing-impaired party 14 and the operator at the operator station 24.

A difficulty arises at the TRS center 12 when a new operator is required. For example, if the hearing-impaired party 10 or the nonhearing-impaired party 14 communicates in a natural language other than that understood by the operator, a new operator may be required. In conventional systems, this difficulty is handled by having a new operator physically take control of the operator station that is fielding the call. For the example depicted in FIG. 1, the operator at operator station 26 may be required to physically take over the operator station 24 in such a situation. This need for an operator to physically move to a new station is both cumbersome and inefficient. Moreover, this approach may be bothersome to the parties involved in the call because it may take a substantial amount of time.

SUMMARY OF THE INVENTION

The limitations of the prior art overcome by the present invention which facilitates the transfer of modem calls without a substantial enough interference to cause the modem call to be dropped during the transfer. In accordance with a first aspect of the present invention, the method is practiced in a telecommunications system that has a first data modem, second data modem, third data modem, and a fourth data modem. Each of the data modems modulates/demodulates an analog carrier signal. In accordance with this method, a first phone call is established between the first data modem and the second data modem. A second phone call is established between the third data modem and the fourth data modem. The first phone call is switched such that a switch phone call is established between the first data modem and the second data modem without dropping the switched call.

In accordance with another aspect of the present invention, a method is practiced wherein the phone call is established between a first data modem and a second data modem within a telecommunications system. A third data modem is added to the call between the first data modem and the second data modem and the second data modem is dropped from the call so as to establish the call exclusively between the first data modem and the third data modem.

In accordance with a further aspect of the present invention, a method is practiced in a Telecommunications Relay Service (TRS) center that has multiple operator stations. A modem call is established between a third data modem at a remote site and a first data modem within the TRS center. A corresponding voice call is established between a first operator station and a third party. The modem call is then switched to a second operator station such that the modem call is between a second data modem at the second operator station and the third modem. The voice call may also be transferred in a corresponding fashion.

In accordance with additional aspect of the present invention, a system includes a first data modem that modulates/demodulates at least one carrier signal for receiving a modem call from a remote data modem. A first computer is coupled to the first data modem and the computer initiates a modem call transfer request. A second data modem is coupled to a second computer. A switching mechanism switches the modem call from the first data modem to the second data modem responsive to a modem call transfer request that is initiated from the first computer without dropping the modem call.

BRIEF DESCRIPTION OF THE DRAWINGS

A preferred embodiment of the present invention will be described below relative to the following figures.

DETAILED DESCRIPTION OF THE INVENTION

The preferred embodiment of the present invention provides a method and system for transferring data modem calls without dropping the calls. Any interruption that results due to the transfer does not result in the dropping of the call. The data modems are modems that modulate/demodulate at least one carrier signal to encode/decode digital data. The method and system of the preferred embodiment of the present invention are especially well-adapted for use in TRS centers that require the transfer of modem calls to operators.

The preferred embodiment of the present invention operates in a situation where a modem call between two data modems, modem 1 and modem 2, has been established. A third modem, modem 3, which is connected to the workstation to which the modem call is to be transferred establishes a data modem call with another modem, modem 4, this is coupled to a server. The modem call between modem 1 and modem 2 is then transferred to modem 3. The call connection to modem 2 and modem 4 are then dropped.

The preferred embodiment of the present invention will be described in more detail below relative to an implementation in a TRS center. Nevertheless, those skilled in the art will appreciate that the present invention may also be practiced in other types of call centers. For present purposes, a "call center" is a facility for receiving and transmitting calls that includes a number of agents or operators for fielding and placing calls.

A "modem call," as used in this context, refers to a connection between two data modems that enables communication between the data modems. The data modems, as used herein, are presumed to be modems that modulate one or more analog carrier signals to encode digital data.

Figure 1:
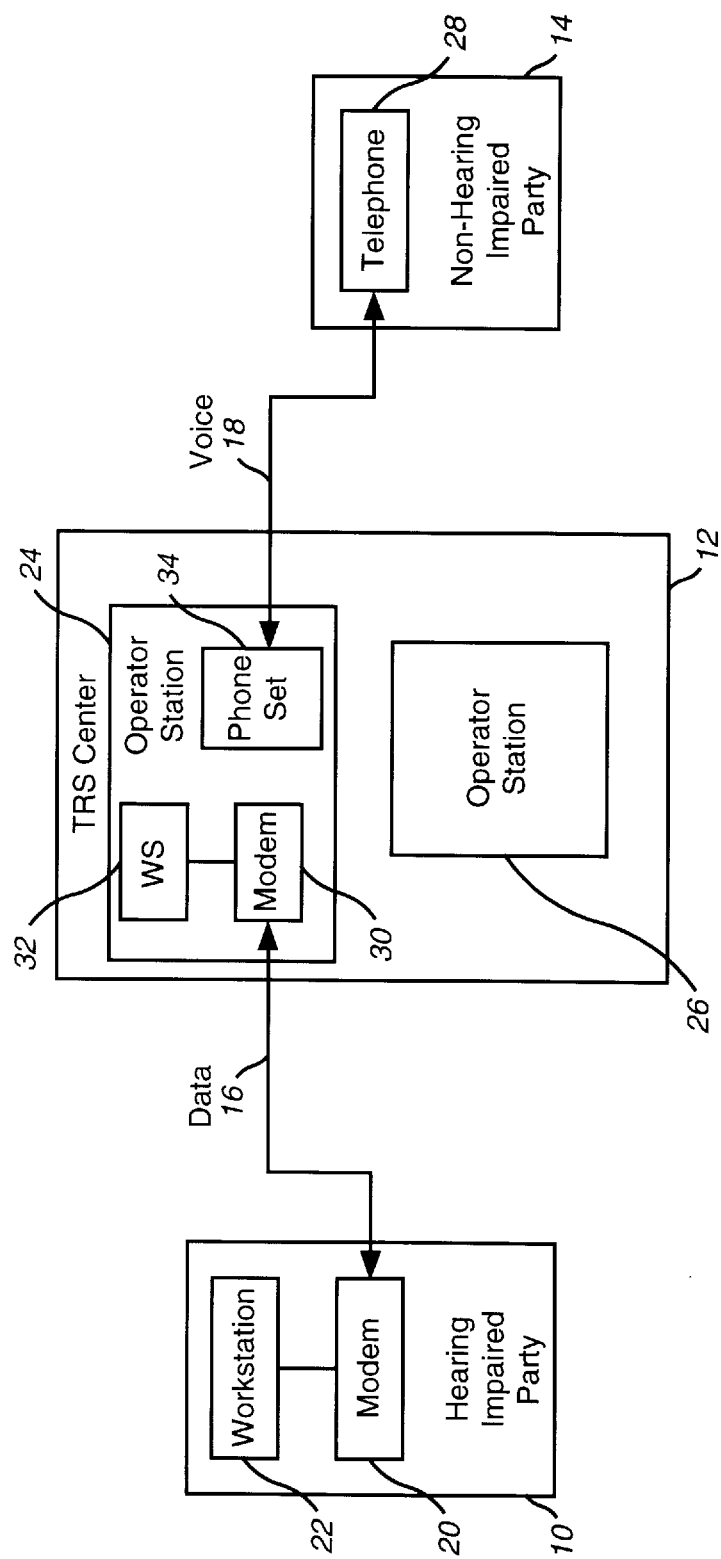
FIG. 1 is a block diagram depicting a conventional telecommunications relay service (TRS) center arrangement.
Figure 2:
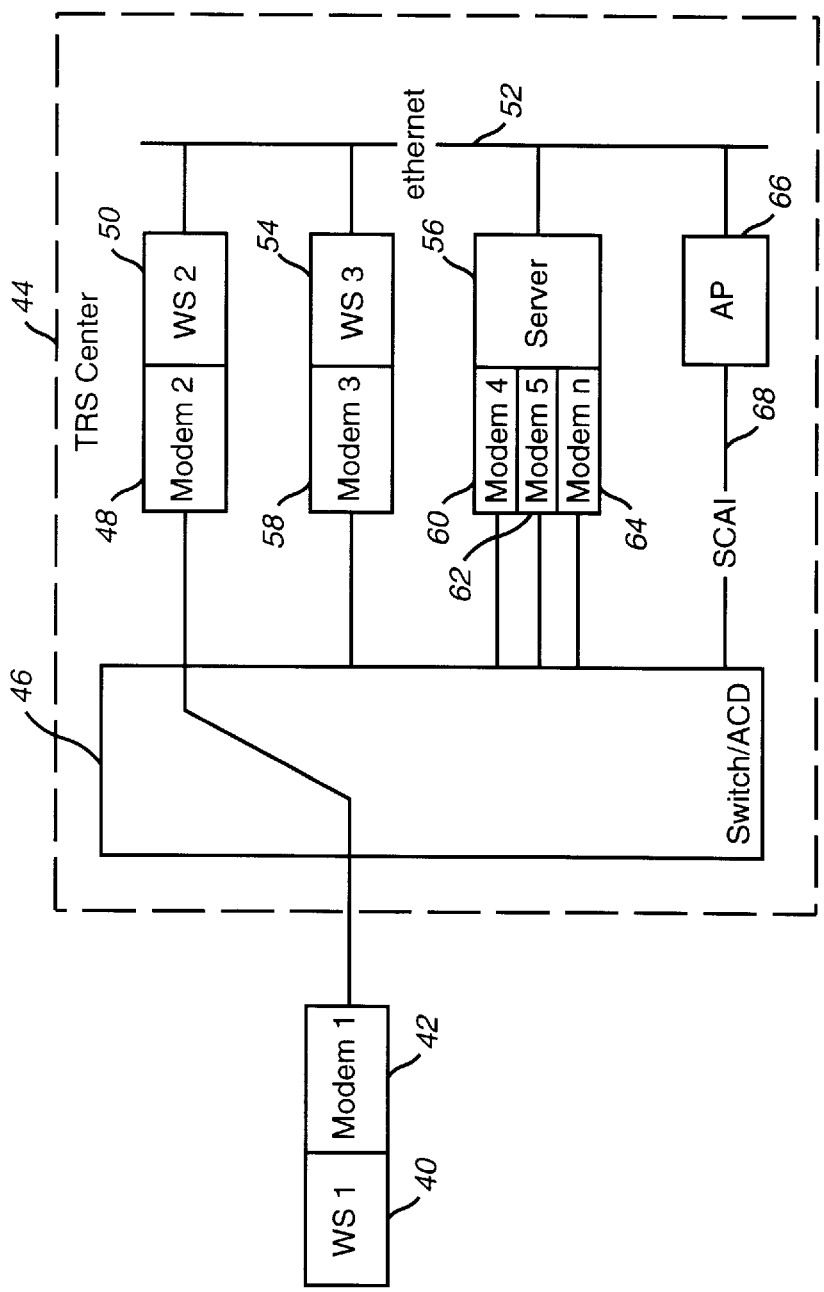
FIG. 2 is a block diagram that illustrates a TRS center that is suitable for practicing the preferred embodiment of the present invention.

FIG. 2 shows an example of a call center arrangement that is suitable for practicing the preferred embodiment of the present invention. An originating party (that originates a modem call) has a workstation 40 and a data modem 42. In the context of a TRS center, it is assumed that this originating party is a hearing-impaired party and that the originating party uses the workstation 40 and the modem 42 to communicate with the TRS center. In particular, a modem call is placed to the TRS center from the modem 42. The TRS center includes an automatic call distributor (ACD) 46 that is used to distribute incoming calls to appropriate destinations within the TRS center 44. The ACD 46 may switch the incoming call to one of the operators within the TRS center. Each operator has their own workstation and a data modem that is coupled to the workstation. In the example depicted in FIG. 2, the incoming call originating from modem 42 is connected and distributed by the ACD 46 to modem 48, which interfaces with workstation 50. This workstation 50 is connected via an Ethernet connection 52 to additional computing resources, including workstation 54 and server 56. The workstation 54 has its own connected modem 58, and the server 56 has a modem pool having n modems 60, 62, and 64. Those skilled in the art will appreciate that these computing resources may be connected by other types of local area network (LAN) connections or other types of interconnection mechanisms. Moreover, those skilled in the art will appreciate that the workstations may be personal computers, or, more generally, any type of computer system. Furthermore, the configuration depicted in FIG. 2 is intended to be merely illustrative and not limiting of the present invention.

The server 56 may be a separate dedicated computer or may be a process on a shared computer. The server 56 may communicate with the ACD 46 via an application processor (AP) 66. The AP 66 is a dedicated computer that supports a switch/computer application interface (SCAI) link 68 to the ACD 46. The AP 66 performs application processing for the ACD 46, such as determining which operator workstation to route calls to. These applications are offloaded to the AP 66 to enable the ACD to be dedicated to switching. Those skilled in the art will appreciate that the present invention can be practiced without the AP 66. Instead, the functionality performed by the AP 66 may be performed by the ACD 46.

Figure 3:
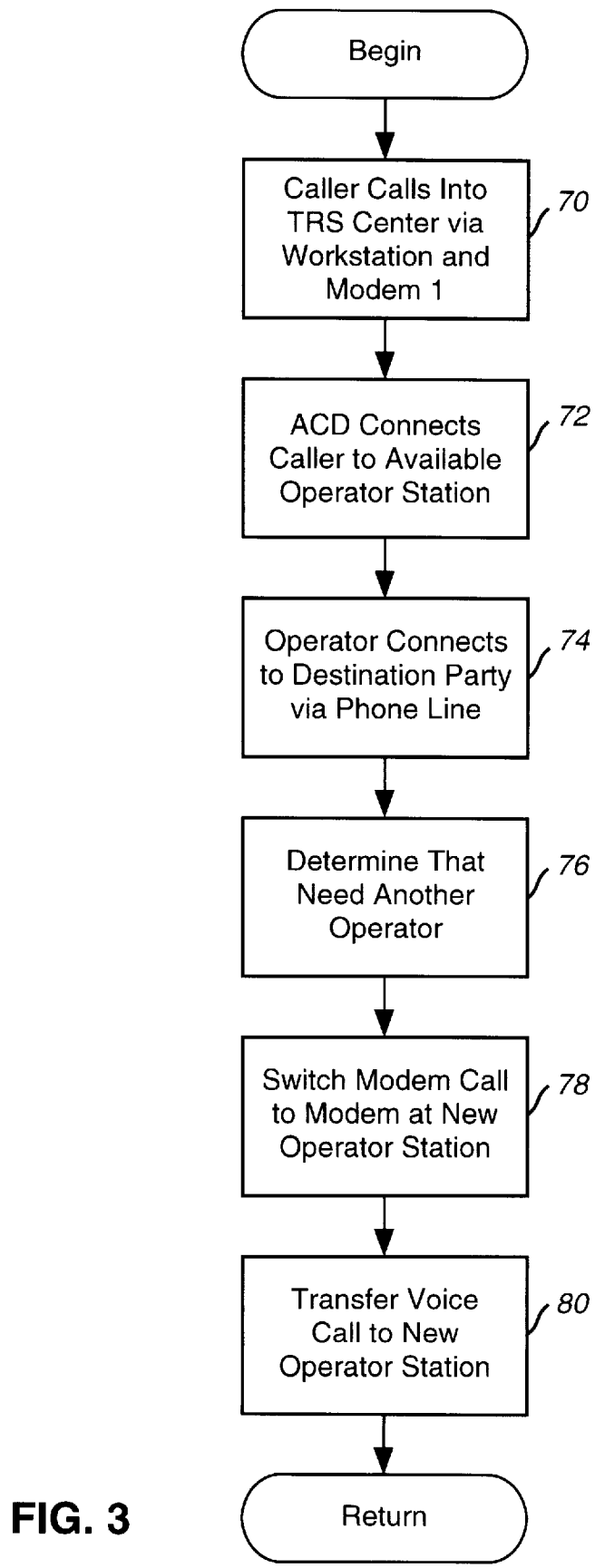
FIG. 3 is a flowchart that provides an overview of the steps performed by the preferred embodiment of the present invention to transfer a call in a TRS center.

FIG. 3 is a flowchart that provides an overview of the steps performed for transferring a modem call in accordance with the preferred embodiment of the present invention. Initially, a caller calls into the TRS center 44 via a workstation and a modem that the caller has available (step 70 in FIG. 3). For the example depicted in FIG. 2, the caller uses workstation 40 to initiate a call through modem 42 to the TRS center 44. In particular, a telephone call for the telephone number the TRS center 44 is placed by modem 42 to initiate the process. The ACD 46 receives the incoming call from modem 42 and connects the call to an available operator station (step 72 in FIG. 3). For the example depicted in FIG. 2, it is assumed that the operator station associated with workstation 50 and modem 48 is available and that the incoming call from modem 42 is forwarded by the ACD 46 to that operator station. As a result, a modem call connection exists between modems 42 and 48.

The operator at the workstation that received the modem call then places a conventional voice call to the destination via the phone line (steps 74 in FIG. 3). The operator serves as a translator for speaking with the party at the destination and for translating speech received from the destination party into text that is forwarded to the caller via the workstation 50. At some point during the phone call, it is determined that another operator is needed (step 76 in FIG. 3). It may be apparent that an operator that is fluent in a different natural language is required or that the operator has other commitments that require the operator to no longer service the call. In such a case, the preferred embodiment of the present invention switches the modem call to a new operator station (step 78 in FIG. 3). The voice call, in turn, is also transferred to the new operator station (step 80 in FIG. 3) such that the entire connection between the caller and the destination is transferred to the new operation station. This transfer occurs without dropping the phone call and, thus, enables the transfer to be realized without requiring the operator to physically change workstations. The details of the modem call switching will be described below.

Those skilled in the art will appreciate that the present invention may also be practiced in instances where the call is initiated from a conventional phone set and is destined to a party that is hearing impaired. Moreover, those skilled in the art will appreciate that the present invention need not require that a complete connection between the caller and the destination be realized before the modem call switching occurs.

Figure 4:
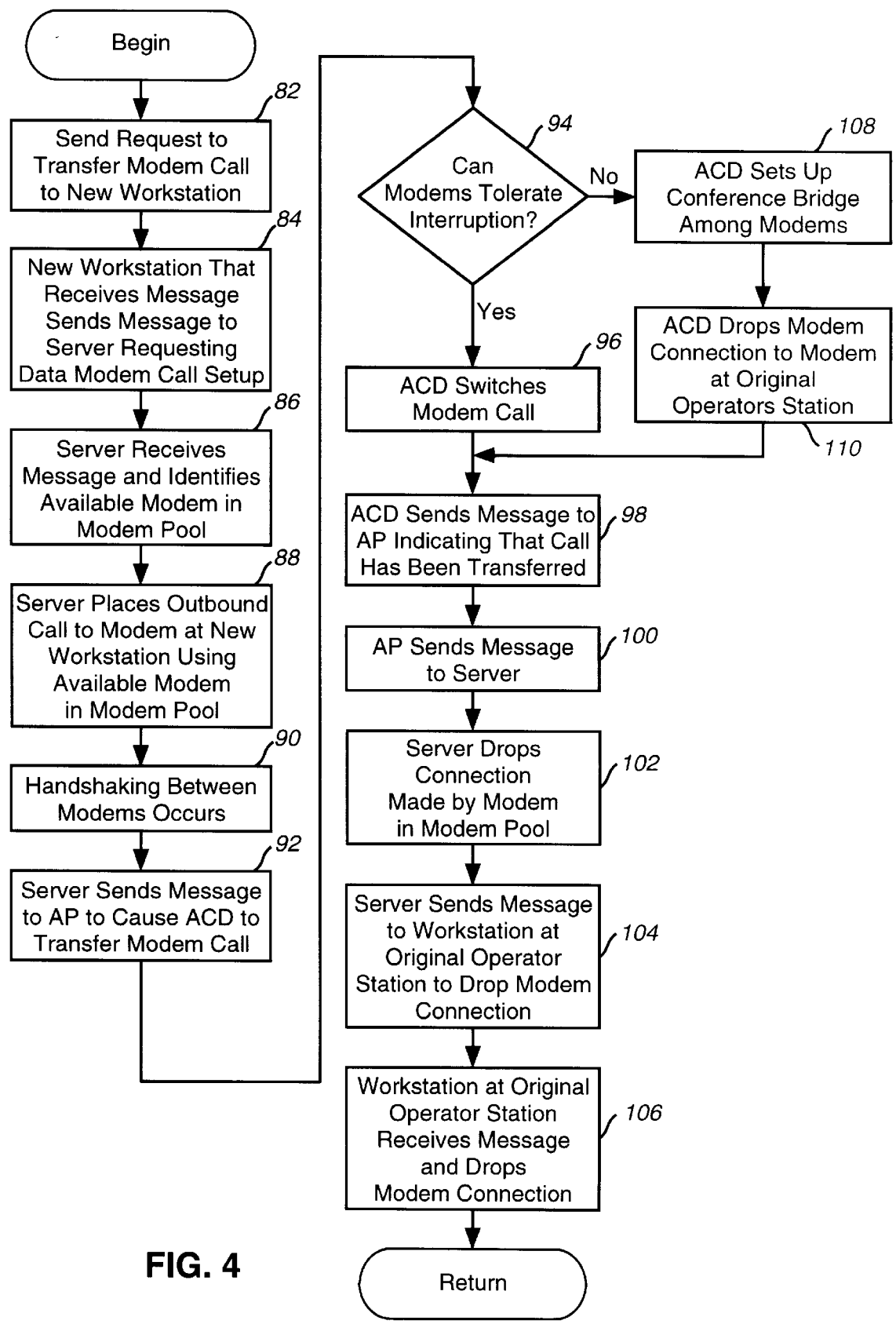
FIG. 4 is a flowchart that illustrates the steps that are performed by the preferred embodiment of the present invention to transfer a data modem call.

FIG. 4 is a flowchart illustrating the steps that are performed to realize the modem call transfer of the preferred embodiment of the present invention. Initially, when the operator realizes that a modem call transfer is necessary, the operator sends a message via the workstation of the operator to the workstation at the operator station that is to take over the call (step 82 in FIG. 4). For purposes of illustration, suppose that the message is sent from workstation 50 (see FIG. 2) to workstation 54, and the message requests transfer of the modem call to the new workstation. The message may be transmitted over the Ethernet connection 52. The workstation 54 at the new operator station may accept the request and if workstation 54 accepts the request, it sends a message to the server 56 requesting a data modem call set-up (step 84 in FIG. 4). The server receives the message requesting a data modem call set-up and identifies an available modem in the modem pool to be used in the data modem call (step 86 in FIG. 4). Those skilled in the art will appreciate that there may be instances where all of the modems in the modem pool are busy, as a result, the server will not be able to accept the request for a data modem call set-up. The number of modems in the modem pool is designed to be large enough so that such instances are rare. Suppose, for illustrative purposes, that the server 56 identifies modem 60 as an available modem that is to be used for the modem call.

The server 56 places an outbound call via modem 60 to modem 58 at the new operator station (step 88 in FIG. 4). A call connection is established between modem 60 and modem 58. The modem call between modem 60 and modem 58 is made through the ACD 46. The call sets up the modem 58 so as to have the same communication parameters that are used in the current modem call between modem 42 and modem 48.

Figure 5:
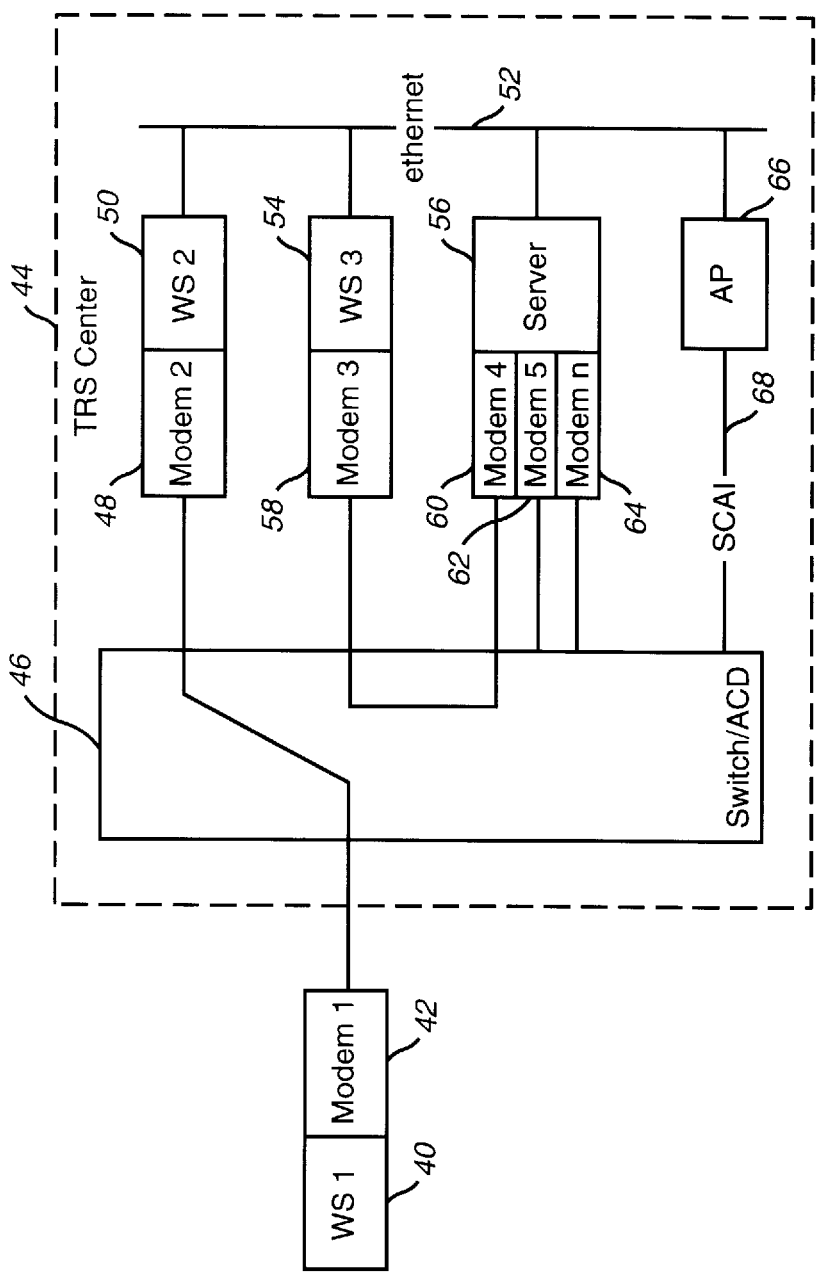
FIGS. 5–7 depict the changing of connections between modems that are performed to practice the preferred embodiment of the present invention.
Figure 7:
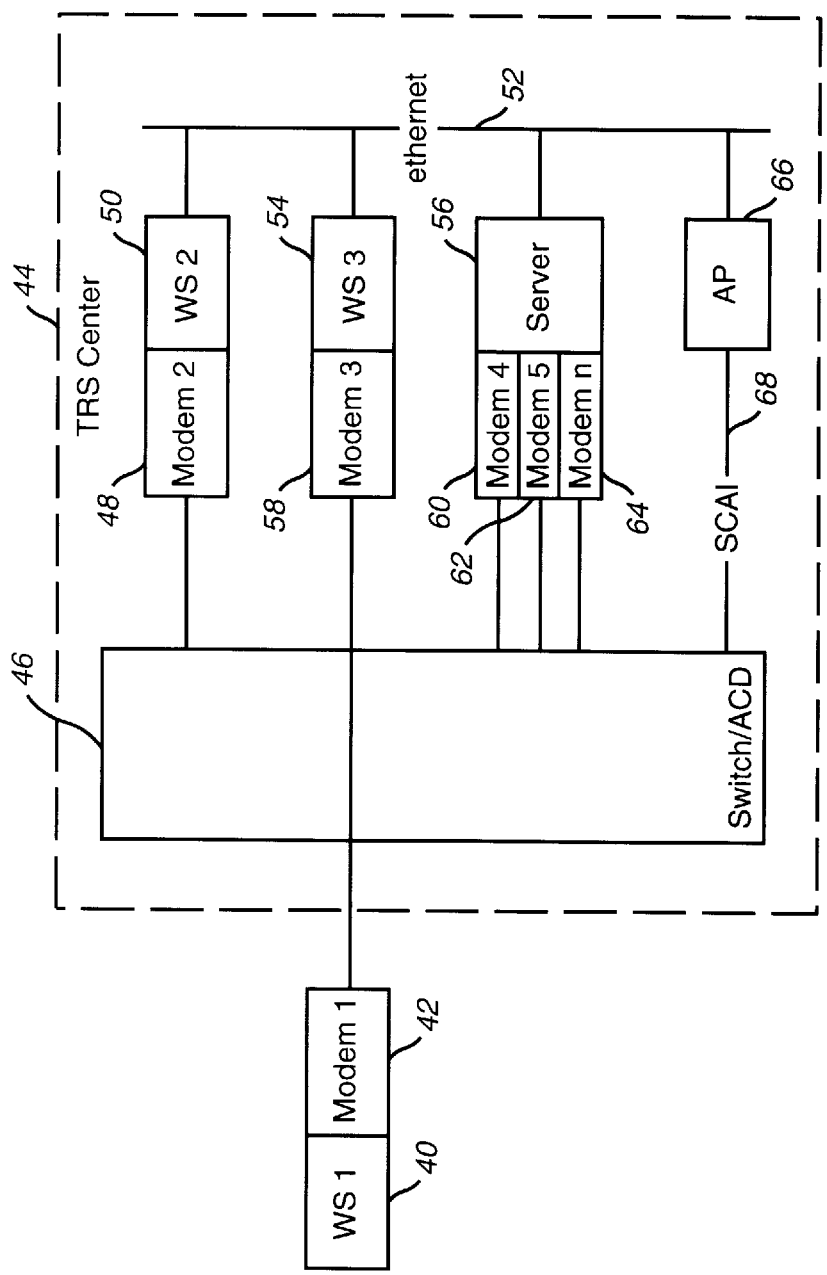

At the initiation of the modem call between modem 60 and modem 58, handshaking is performed (step 90 in FIG. 4). Once the handshaking has been completed, modem 58 is active and ready to accept the call transfer from modem 48. Server 56 detects the completion of the handshaking and sends a message to the ACD 46 (via AP 66) to transfer the modem call (step 92 in FIG. 4). At this point in time, the connections between the modems appear as shown in FIG. 5. The steps that are performed to realize the modem call transfer depend upon the modems that are involved in the transfer. A standard data modem may tolerate interruption of up to 100 milliseconds. If the modems can tolerate the interruption that will be caused by the modem call transfer through the ACD (see step 94), the ACD then switches the modem call (step 96 in FIG. 4). In particular, the ACD 46 switches the connection with modem 42 from a port leading to modem 48 to a port leading to modem 58. During this time, modem 42 and modem 58 experience an interruption in their carrier signal. The modems 42 and 58 then resynchronize their signals so as not to drop the call. The interruption is negligible enough so as not to be problematic. After the switching is completed, the interconnection between the modems appears as shown in FIG. 7. Specifically, the connection is realized via ACD 46 between modem 42 and modem 58.

Figure 6:
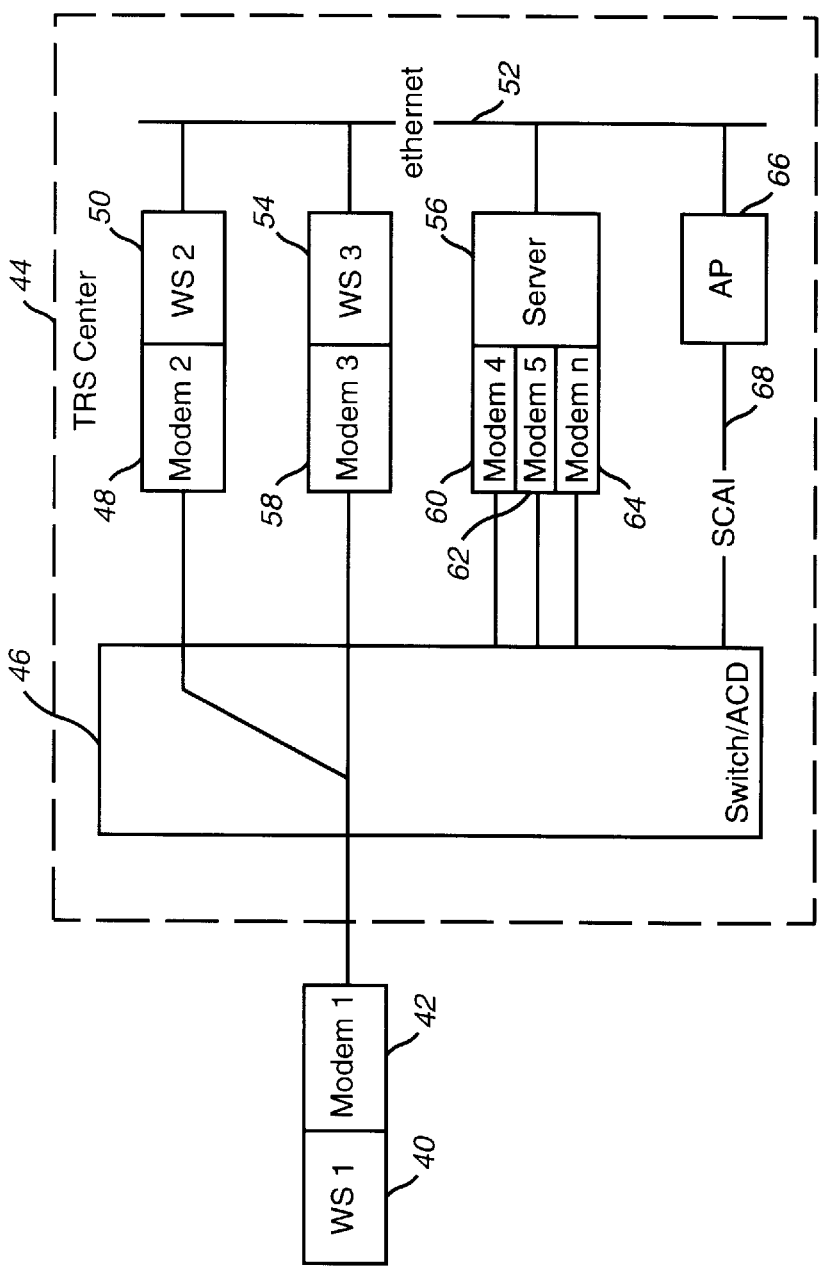

In the case where the modems cannot tolerate the interruption that will be realized by the ACD directly switching the modem call, the ACD sets up a conference bridge among modems 42, 48, and 58 (step 108 in FIG. 4). Thus, as shown in FIG. 6, modem 42, modem 48 and modem 50 are all on a single modem call. Once the bridge is established, the ACD 46 drops the connection with modem 48 to yield the connection between modems 42 and 58 as shown in FIG. 7 (step 110 in FIG. 4).

After the call transfer, the ACD 46 sends a message to the AP 66 over the SCAI link 68 indicating that the call has been transferred (step 98 in FIG. 4). The AP 66 then sends the message to the server 56 relaying that the modem call transferred (step 100 in FIG. 4). In response to receiving the message, the server 56 drops the connection made by the modem in the modem pool (i.e., modem 60) that was used to create the connection to modem 58 (step 102 in FIG. 4). The server also sends a message to the workstation at the original operator station (i.e., a workstation 50) to drop the modem connection (step 104 in FIG. 4). The workstation at the original operator station receives the message and drops the modem connection (step 106 in FIG. 4).

As mentioned above, the present invention may be practiced in environments other than TRS centers. In general, the present invention may be applied to the transferring of modem calls. In one example alternative application, concerns Internet access. In such a case, the workstation 40 (FIG. 2) dials in via modem 42 to an Internet access provider. The Internet access provider employs an Internet server that has a modem, such as modem 48, where the Internet server is workstation 50. At some point in time, it may be desirable to switch the modem call to another workstation or server and the above-described process may be performed to realize the modem call transfer.

While the present invention has been described with reference to a preferred embodiment thereof, those skilled in the art will appreciate that various changes in form or detail may be made without departing from the intended scope of the present invention as defined in the appended claims.

I claim:

1. In a telecommunications system having a first data modem, a second data modem, a third data modem and a fourth data modem, wherein each of the data modems modulates/demodulates an analog carrier signal, a method comprising the steps of:

establishing a first phone call between the first data modem and the second data modem;

establishing a second phone call between the third data modem and the fourth data modem; and switching the first phone call between the first data modem and the second data modem to the third data modem such that a switched phone call is established between the first data modem and the third data modem without dropping the switched call.

2. The method of claim 1 wherein the telecommunications mechanism includes a switching mechanism, and the switching mechanism performs the switching step.

3. The method of claim 2 wherein the switching mechanism has a port connection that interfaces with the second data modem and a port connection that interfaces with the fourth data modem and wherein the switching entails dropping the port connection that interfaces with the second data modem and dropping the port connection that interfaces with the fourth data modem.

4. The method of claim 1 wherein the telecommunications system includes a server having a modem pool with multiple modems, wherein the third data modem is part of the modem pool and wherein the server initiates the second phone call between the third data modem and the fourth data modem.

5. The method of claim 1 wherein the second data modem, the third data modem and the fourth data modem are part of a call center.

6. The method of claim 5 wherein the call center is a telecommunications relay service (TRS) center.

7. In a telecommunications system having a first data modem, a second data modem and a third data modem, wherein each of the data modems modulates/demodulates an analog carrier signal, a method comprising the steps of:

establishing a phone call between the first data modem and the second data modem;

adding the third data modem to the call between the first data modem and the second data modem; and dropping the second data modem for the call such that the call is between the first data modem and the third data modem.

8. The method of claim 7 wherein the second data modem and the third data modem are part of a call center.

9. The method of claim 8 wherein the call center is a telecommunications relay service (TRS) center.

10. The method of claim 7 wherein the telecommunications system includes an automatic call distributor (ACD) and wherein the ACD performs the dropping step.

11. In a telecommunications relay service (TRS) center having a first operator station with a first workstation and a second modem, and a second operator station with a second workstation and second modem, a method comprising the steps of:

establishing a modem call between a third data modem at a remote site and the first data modem;

establishing a corresponding voice call between the first operator station and a third party; and switching the modem call to the second operator station such that the modem call is between the second data modem and the third data modem.

12. The method of claim 11 wherein the TRS center includes a fourth data modem, and wherein the switching further comprises establishing a second modem call between the fourth data modem and the second data modem to make the second data modem active.

13. The method of claim 12 wherein the switching further comprises dropping the fourth data modem from the second call.

14. The method of claim 12 wherein the TRS center includes a server computer and the fourth data modem is coupled to the server computer.

15. The method of claim 14 wherein the fourth data modem is part of a modem pool of multiple modems coupled to the server.

16. The method of claim 11 wherein the switching comprises adding the second data modem to the modem call between the first data modem and the third data modem and dropping the first modem from the call after the second data modem has been added.

17. The method of claim 11, further comprising the step of switching the corresponding voice call to the second operator station.

18. A system, comprising:

a first data modem, that modulates/demodulates at least one analog carrier signal for receiving a modem call from a remote data modem;

a first computer coupled to the first data modem, said first computer being programmed to initiate a modem call transfer request;

a second data modem that modulates/demodulates at least one carrier signal;

a second computer coupled to the second data modem; and a switching mechanism for switching a modem call from the first data modem to the second data modem responsive to a modem call transfer request initiated from the first computer, without dropping the modem call.

19. The system of claim 18 wherein the switching mechanism is an automatic call distributor (ACD).

20. The system of claim 18 wherein the system is part of a call center.

21. The system of claim 20 wherein the system is part of a telecommunications relay service (TRS) center.

22. The system of claim 18, further comprising:

a third data modem; and a server computer coupled to the third data modem for establishing another modem call between the second data modem and the first data modem.

23. The method of claim 22 wherein the server computer is programmed to instruct the switching mechanism to perform the switching.

* * * * *